(12) United States Patent
Becerra et al.

(10) Patent No.: US 7,553,571 B2
(45) Date of Patent: Jun. 30, 2009

(54) MANAGEMENT SYSTEM FOR A FUEL CELL AND METHOD THEREOF

(75) Inventors: Juan J. Becerra, Altamont, NY (US); Michael S. DeFilippis, Delmar, NY (US)

(73) Assignee: The Gillette Company, Boston, MA (US)

( * ) Notice: Subject to any disclaimer, the term of this patent is extended or adjusted under 35 U.S.C. 154(b) by 654 days.

(21) Appl. No.: 10/414,509

(22) Filed: Apr. 15, 2003

(65) Prior Publication Data
US 2005/0014041 A1    Jan. 20, 2005

(51) Int. Cl.
*H01M 8/04* (2006.01)
*H01M 8/12* (2006.01)
*H01M 8/00* (2006.01)

(52) U.S. Cl. .......................................... 429/22; 429/12
(58) Field of Classification Search ................ 429/12, 429/22
See application file for complete search history.

(56) References Cited

U.S. PATENT DOCUMENTS

| | | | |
|---|---|---|---|
| 5,932,365 A | * | 8/1999 | Lin et al. ............... 429/12 |
| 6,180,272 B1 | | 1/2001 | Byrne et al. |
| 6,280,865 B1 | * | 8/2001 | Eisman et al. ............. 429/17 |
| 6,455,181 B1 | | 9/2002 | Hallum |
| 6,458,479 B1 | | 10/2002 | Ren et al. |
| 6,460,733 B2 | | 10/2002 | Acker et al. |
| 2002/0086193 A1 | | 7/2002 | Acker et al. |
| 2003/0031907 A1 | | 2/2003 | Gottesfeld |

FOREIGN PATENT DOCUMENTS

| | | |
|---|---|---|
| JP | 64-77878 A | 3/1989 |
| JP | 02-82459 A | 3/1990 |
| JP | 2002373230 A | 12/2002 |

* cited by examiner

*Primary Examiner*—Patrick Ryan
*Assistant Examiner*—Julian Mercado
(74) *Attorney, Agent, or Firm*—Cesari and McKenna, LLP (57) ABSTRACT

A fuel cell system includes a fuel cell, a fuel supply system, and a fuel cell control system. The fuel cell converts fuel into electrical energy. The fuel supply system is connected to the fuel cell and the fuel cell control system is coupled to the fuel cell and the fuel supply system. The fuel cell control system manages fuel supplied from the fuel supply system to the fuel cell based on information about at least one of the fuel and the fuel supply system to control the conversion of the fuel into electrical energy

8 Claims, 8 Drawing Sheets

MANAGEMENT SYSTEM FOR A FUEL CELL AND METHOD THEREOF

FIELD OF THE INVENTION

This invention generally relates to fuel cells and, more particularly, to a management system for a fuel cell and a method thereof.

BACKGROUND OF THE INVENTION

Fuel cell technologies present opportunities for the commercial development of long-lasting power sources for portable power and electronics applications. With the trend toward greater portability of a wide array of consumer electronics, some fuel cell technologies offer promising alternative power sources to meet the increased demand for portable power. Fuel cells can potentially replace or favorably compete with the various types of high density batteries presently used in consumer electronics, such as nickel metal-hydride and lithium ion battery systems, as well as relatively inexpensive alkaline batteries. These types of batteries are less than satisfactory power sources for such consumer electronics as laptop computers and cellular phones either due to their low power density, short cycle life, rechargability or cost. In addition, all these types of batteries present environmental safety concerns and costs for proper disposal.

Fuel cell systems are electricity-generating devices that convert chemical energy into useable electrical energy via electrochemical reactions involving a fuel reactant, such as natural gas, methanol, ethanol, or hydrogen, and an oxidizing agent, typically oxygen from ambient air. Fuel cell systems may be divided into "reformer-based" systems, i.e., those in which the fuel is processed in some fashion before it is introduced into the cell, or "direct oxidation" systems, i.e., those in which the fuel is fed directly into the cell without internal processing. Most currently available stationary fuel cells are reformer-based fuel cells. However, fuel processing requirements for such cells limits the applicability of those cells to relatively large systems. As such, direct oxidation fuel cells, which do not have the need to reform fuel, are attractive power sources for handheld portable electronics.

Although direct oxidation fuel cell systems are a promising power source, they are limited by the fact that they are designed to operate using a designated fuel or a limited number of appropriate fuels. Prior fuel cell systems have not been designed to ensure that only a compatible fuel is delivered to the fuel cell system.

Additionally, prior fuel cell systems have been limited because they have not been designed to regulate the delivery of fuel in a manner that is consistent with the fuel cell system's ability to receive fuel. As a result, the performance of these prior fuel cell systems has not been optimized.

Further, prior fuel cell systems have not been designed to ensure that only devices capable of safely delivering fuel to the fuel cell system are used. As a result, prior fuel cell systems have posed risks to operators when improper refilling devices have been used.

Prior fuel cell systems have also had problems with the management of the operation of the fuel cell system. For example, prior fuel systems have not been able to monitor the level or amount of fuel remaining to be able to signal an operator when a new fuel canister is needed or to automatically replenish fuel as it is depleted. Additionally, prior fuel cell systems have not been able to monitor characteristics of the fuel and to adjust the fuel supply characteristics based on the monitored data.

SUMMARY OF THE INVENTION

A fuel cell system in accordance with embodiments of the present invention includes a fuel cell, a fuel supply system, and a fuel cell control system. The fuel cell converts fuel into electrical energy. The fuel supply system is in fluid communication with the fuel cell and the fuel cell control system is coupled to the fuel cell and the fuel supply system. The fuel cell control system manages fuel supplied from the fuel supply system to the fuel cell based on information about at least one of the fuel and the fuel supply system to control the conversion of the fuel into electrical energy.

A method for controlling operation of a fuel cell system in accordance with embodiments of the present invention includes supplying fuel, converting the supplied fuel into electrical energy, and regulating the supplying based on information about the supplied fuel to control the conversion of the fuel into electrical energy.

The present invention provides a system and method for effectively and efficiently managing refueling and fuel delivery in a fuel cell system. With the present invention, sensed, calculated, or recorded information, such as the volume of remaining fuel, fuel concentration, and the history of use of the fuel canister or cartridge, can be obtained from and/or sent to the fuel canister or cartridge. Additionally, static information, such as the manufacture date and identifying serial number of the fuel canister or cartridge or the fuel cell, can be obtained from and/or sent to the fuel canister or cartridge. The present invention can also determine when the fuel canister or cartridge needs to be refilled and can control the refilling operations and also the removal of spent fuel. Further, with the present invention the fuel supply system can perform in field operating software upgrades.

DETAILED DESCRIPTION

Figure 1A:
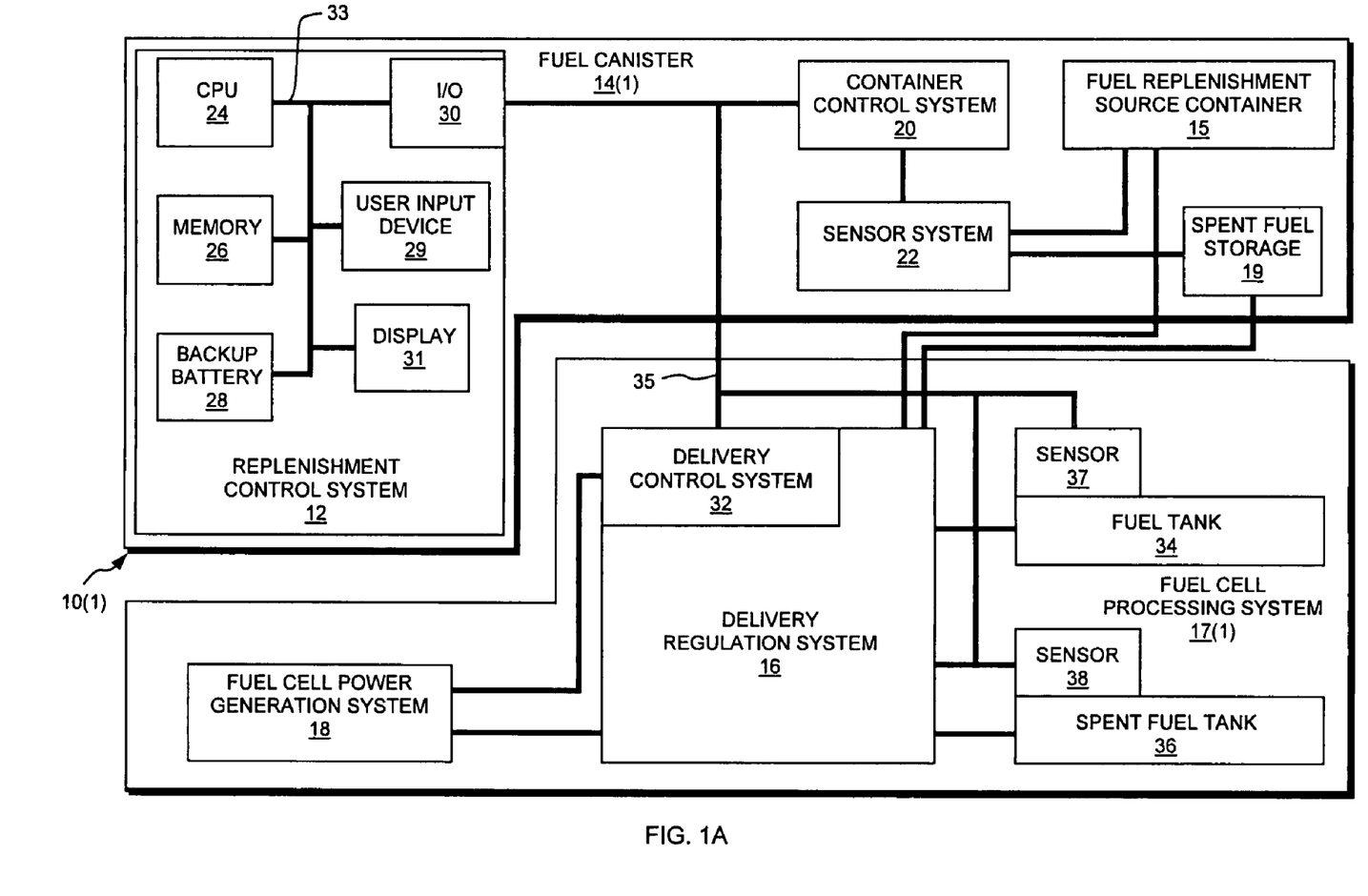
FIG. 1A is a block diagram of a fuel cell system with a canister in accordance with embodiments of the present invention.
Figure 1B:
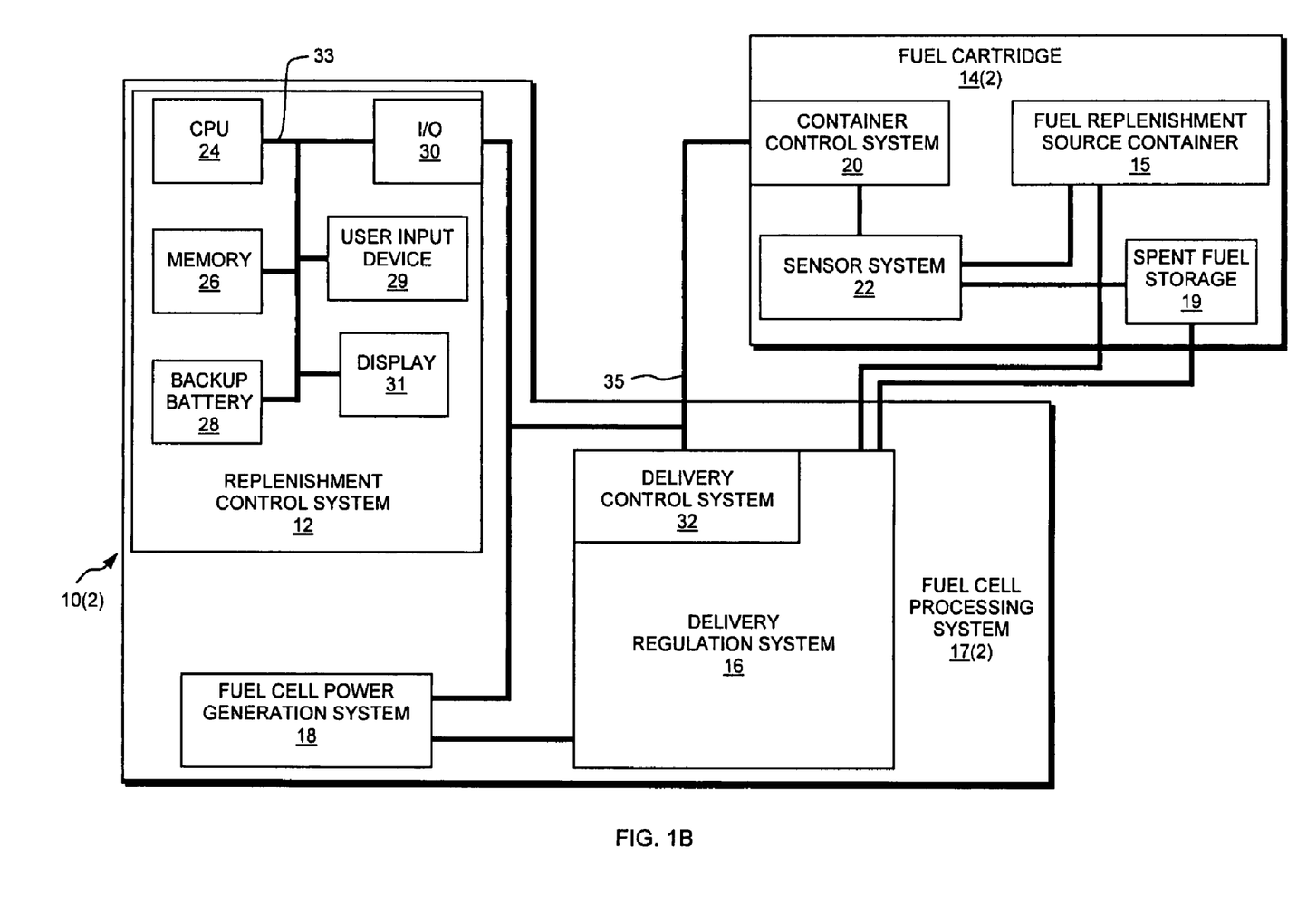
FIG. 1B is a block diagram of a fuel cell system with a cartridge in accordance with embodiments of the present invention.

Fuel cell systems 10(1) and 10(2) in accordance with embodiments of the present invention are illustrated in FIGS. 1A and 1B. In these embodiments, the fuel cell system 10(1) includes a fuel canister 14(1) and a fuel cell processing system 17(1) and the fuel cell system 10(2) includes a fuel cartridge 14(2) and a fuel cell processing system 17(2), although the fuel cell systems 10(1) and 10(2) may comprise other components, other numbers of the components, and other combinations of the components which are coupled together in other manners. The fuel cell processing systems 17(1) and 17(2) also have connections to an appliance receiving power from the fuel cell processing systems 17(1) and 17(2), and may therefore utilize any computation, memory, or display functions in the appliance to perform calculations, store information, display data, or receive input pertinent to the operation of the fuel cell systems 10(1) or 10(2). The present invention provides system and method for effectively and efficiently managing refueling and fuel delivery in fuel cell systems.

Referring more specifically to FIG. 1A, the fuel cell system 10(1) includes a fuel canister 14(1) which is detachably coupled to a fuel cell processing system 17(1). A variety of different communication paths can be set up between fuel canister 14(1) and 17(1), such as a one way communication from the fuel canister 14(1) to the fuel cell processing system 17(1), a one way communication from the fuel cell processing system 17(1) to the fuel canister 14(1), or a two way communication between the canister 14(1) and fuel cell processing system 17(1). The fuel cell processing system 17(1) also is coupled to an appliance receiving power from it, and may therefore utilize any computation, memory, or display functions in the appliance to perform calculations, store information, display data, or receive input pertinent to the operation of the fuel cell system 10(1).

The fuel canister 14(1) is detachably connected and stores fuel and any spent fuel for the fuel system 10(1). Although a fuel canister 14(1) is shown, a variety of different types of fuel holding systems can be used depending on the particular fuel cell system, such as the fuel cartridge 14(2) described in greater detail with reference to FIG. 1B. An example of a fuel canister 14(1) is disclosed in U.S. Pat. No. 6,460,733 for a Multiple Walled Fuel Container and Delivery System, by Acker, et al., which is herein incorporated by reference in its entirety.

The fuel canister 14(1) includes a replenishment control system 12, a container control system 20, a sensor system 22, a fuel replenishment source container 15, and a spent fuel storage 19, although the fuel canister 14(1) may comprise other components, other numbers of the components, and other combinations of the components which are coupled together in other manners. The replenishment control system 12 is coupled to the container control system 20. The container control system 20 is coupled to the sensor system 22 which is coupled to a fuel replenishment source container 15 and a spent fuel storage 19,. The fuel replenishment source container 15 and the spent fuel storage 19 are in fluid communication with the delivery regulation system 32 which is in fluid communication with fuel cell power generation system or fuel cell 18, fuel tank 34, and spent fuel tank 36. In this particular embodiment, the fuel canister 14(1) has a communication interface which is detachably coupled to the container control system 20 to provide a communication link between the fuel canister 14(1) and the fuel processing system 17(1). An example of one type of detachable electrical connection which can be used is a PCMCIA connection system, although other types of detachable connections can be used, such as an infrared or a wireless communication link.

The replenishment control system 12 has a processor 24, a memory 26, backup battery 28, a user input device 29, an I/O interface system 30, and display 31, which are coupled together by one or more buses, although replenishment control system 12 can have other components, other numbers of the components, and other combinations of the components which are coupled together in other manners. In the replenishment control system 12, the memory 26 stores programmed instructions and data for controlling operation of a fuel cell system 10(1) in accordance with embodiments of the present invention as described and illustrated herein for execution by the processor, although some or all of these instructions and data may be stored elsewhere. A variety of different types of memory storage devices, such as a random access memory (RAM), a read only memory (ROM) or a floppy disk, hard disk, CD ROM, or other computer readable medium which is read from and/or written to by a magnetic, optical, or other reading and/or writing system coupled to the processor, can be used. The backup battery 28 can be used to provide power to the system 10 when the fuel cell 18 is not generating power. The user input system 29, such as a keyboard or mouse, in the replenishment control system 12 or from another device in communication with the replenishment control system 12 enables an operator manager to enter requests and data into the replenishment control system 12. The display 31, such as a graphical user interface or printer, enables the manager to view information, such as information about the fuel container, an amount or level of fuel, or fuel concentration. The I/O interface system 30 in replenishment control system 12 is coupled to a container control system 20 in fuel container 14 and to a delivery control system 32 in delivery regulation system 16 via the network 35 using one or more of a variety of different communication protocols.

The replenishment control system 12 is coupled via the communication network 35 to the fuel cell 18, the container control system 20, and the delivery control system 32, although the replenishment control system 12 may be coupled to other components in other manners. A variety of different types of connection systems and communication protocols can be used with these components.

In this particular embodiment, the container control system 20 in fuel canister 14(1) has a processor, memory, and an I/O interface system which are coupled together by one or more buses and has fluid management components, such as pipes or other conduits, valves, and pumps, for controlling the flow of fuel and spent fuel to and from replenishment source container 15 and spent fuel storage 19, although container control system 20 can have other components, other numbers of the components, and other combinations of the components which are coupled together in other manners. For example, the container control system 20 may be a integrated circuit or chip which stores data about the fuel canister 14(1). In the container control system 20, the memory stores information about the fuel canister 14(1), such as the serial number, type of fuel, and history of prior use of the fuel canister 14(1), and has programmed instructions for controlling operation of sensor system 22 and the fuel cell system 10(1) in accordance with embodiments of the present invention as described and illustrated herein for execution by the processor, although some or all of these instructions and data may be stored elsewhere. A variety of different types of memory storage devices, such as a random access memory (RAM), a read only memory (ROM) or a floppy disk, hard disk, CD ROM, or other computer readable medium which is read from and/or written to by a magnetic, optical, or other reading and/or writing system coupled to the processor, can be used. The I/O interface system in container control system 20 is coupled to I/O interface system 30 in replenishment control system 12 and to delivery control system 32 in delivery regulation system 16 via the network 35 using one or more of a variety of different communication protocols.

The sensor system 22 is in or otherwise in communication with the fuel canister 14(1) and is used to obtain information, such as a measurement of the level or amount of fuel remaining or the concentration of the fuel in the fuel replenishment source container 15 and a measurement of the amount or concentration of spent fuel remaining in the spent fuel storage 19. The sensor system 22 is coupled to the container control system 20, although the sensor system 22 could be connected in other manners, such as coupled directly to the replenishment control system 12. Since different types of sensor systems, such as those for measuring a level or amount of fuel or a measurement of fuel concentration, are well known to those of ordinary skill in the art they will not be described in detail here. An example of a sensor system in a fuel cell system is disclosed in U.S. Pat. No. 6,794,067, issued on Sep. 21, 2004, for a "Fuel Cell Control and Measurement Apparatus Using Dielectric Constants, by Acker et al., which is herein incorporated by reference in its entirety.

The fuel cell processing system 17(1) includes a delivery regulation system 16, a fuel cell 18, a replenishment tank 34, and a spent fuel tank 36, although the fuel cell processing system 14(1) may comprise other components, other numbers of the components, and other combinations of the components which are coupled together in other manners.

The delivery regulation system 16 includes pipes or other conduits, valves, and pumps and a delivery control system 32 which controls the operation of these valves and pumps, such as which valves are open or closed and which pumps are turned on. The delivery regulation system is fluidly connected between the fuel replenishment source container 15 and the fuel tank 34 and between the spent fuel storage 19 and the spent fuel tank 36. The delivery regulation system 16 regulates the supply or flow of fuel, in liquid, solid, or vapor form, with valves and/or pumps along pipes or with other transfer mechanisms from the fuel replenishment source container 15 to the fuel cell 18 or to the fuel tank 34, from the fuel tank 34 to the fuel cell 18, spent fuel from the fuel cell 18 to the spent fuel tank 36, and spent fuel from the spent fuel tank 36 to the spent fuel storage 19, although the delivery regulation system 16 could be used to regulate the flow in other manners and between other components. Since delivery regulation systems with components, such as pipes, valves, and pumps, for regulating flow are well known to those of ordinary skill in the art they will not be described in detail here. An example of a delivery regulation system in a fuel cell system is disclosed in U.S. Pat. No. 6,686,081, issued on Feb. 3. 2004, for Methods and Apparatuses for a Pressure Driven Fuel Cell System by Gottesfeld, which is herein incorporated by reference in its entirety.

The delivery control system 32 in delivery regulation system 16 has a processor, memory, and an I/O interface system, which are coupled together by one or more buses, although delivery control system 32 can have other components, other numbers of the components, and other combinations of the components which are coupled together in other manners and other types of delivery control systems, such as a MEMS device could be used to control the operation of valves and pumps in the delivery regulation system 16. In the delivery control system 32, the memory has stored programmed instructions for controlling operation of the delivery regulation system 16 in accordance with embodiments of the present invention as described and illustrated herein for execution by the processor, although some or all of these instructions and data may be stored elsewhere. A variety of different types of memory storage devices, such as a random access memory (RAM), a read only memory (ROM) or a floppy disk, hard disk, CD ROM, or other computer readable medium which is read from and/or written to by a magnetic, optical, or other reading and/or writing system coupled to the processor, can be used. The I/O interface system in delivery control system 32 is coupled to I/O interface system 30 in replenishment control system 12 and to container control system 20 in fuel canister 14(1) via the network 35 using one or more of a variety of different communication protocols.

The fuel tank 34 is a supply of fuel which can be used to replenish fuel in the fuel cell 18. The fuel tank includes a sensor system 37 which is in or otherwise in communication with the fuel tank 34. The sensor system 37 is used to obtain information, such as a measurement of the level or amount of fuel remaining or the concentration of the fuel in the fuel tank 34. The spent fuel tank 36 is a temporary repository of fuel which can be used to hold spent or unusable fuel from the fuel cell 18. The spent fuel tank 36 includes a sensor system 38 which is in or otherwise in communication with the spent fuel tank 36. The sensor system 38 is used to obtain information, such as a measurement of the level or amount of fuel remaining or the concentration of the fuel in the spent fuel tank 36. The sensor systems 37,38 are coupled to the delivery control system 32. Since different types of sensor systems, such as those for measuring a level or amount of fuel or a measurement of fuel concentration, are well known to those of ordinary skill in the art they will not be described in detail here.

The fuel cell 18 converts fuel into electrical energy. One example of a fuel cell is disclosed in U.S. Pat. No. 6,458,479 for an Air Breathing Direct Methanol Fuel Cell by Ren et al. issued on Oct. 1, 2002, which is herein incorporated by reference. Since fuel cells are well known to those of ordinary skill in the art they will not be described in detail here.

Although one example of a fuel cell system 10(1) is shown, other partitions of the components in the fuel cell system 10(1) are possible, such as the placement of all of the fuel control elements in the container control system 20 and the delivery control system 32 in one centralized location if the fuel delivery controls were fully contained in the fuel cell processing system 17(1). In another example, the replenishment control system 12 might be fully contained in the fuel cell processing system 17(1).

Referring to FIG. 1B, a fuel cell system 10(2) in accordance with embodiments of the present invention is illustrated. The fuel cell system 10(2) is identical to the fuel cell system 10(1), except as described herein. Elements in FIG. 1B which are like elements shown and described in FIG. 1A will have like numbers and will not be shown and described in detail again here.

The fuel cell system 10(2) includes a removable fuel cartridge 14(2) which is detachably coupled to a fuel cell processing system 17(2). In this embodiment, the fuel cartridge 14(2) includes a fuel replenishment source container 15 and spent fuel storage 19, however unlike embodiment 10(1), there are no other holding tanks for fuel or spent fuel in the fuel cell processing system 17(1). In addition, the replacement control system 12 is included in the fuel cell processing system 17(1). As will be recognized by those of ordinary skill in the art, partitions of the fuel cell system may defined in other manners, such as the inclusion of some or all of the replenishment control system 12 in the fuel cartridge 14(2).

Figure 2A:
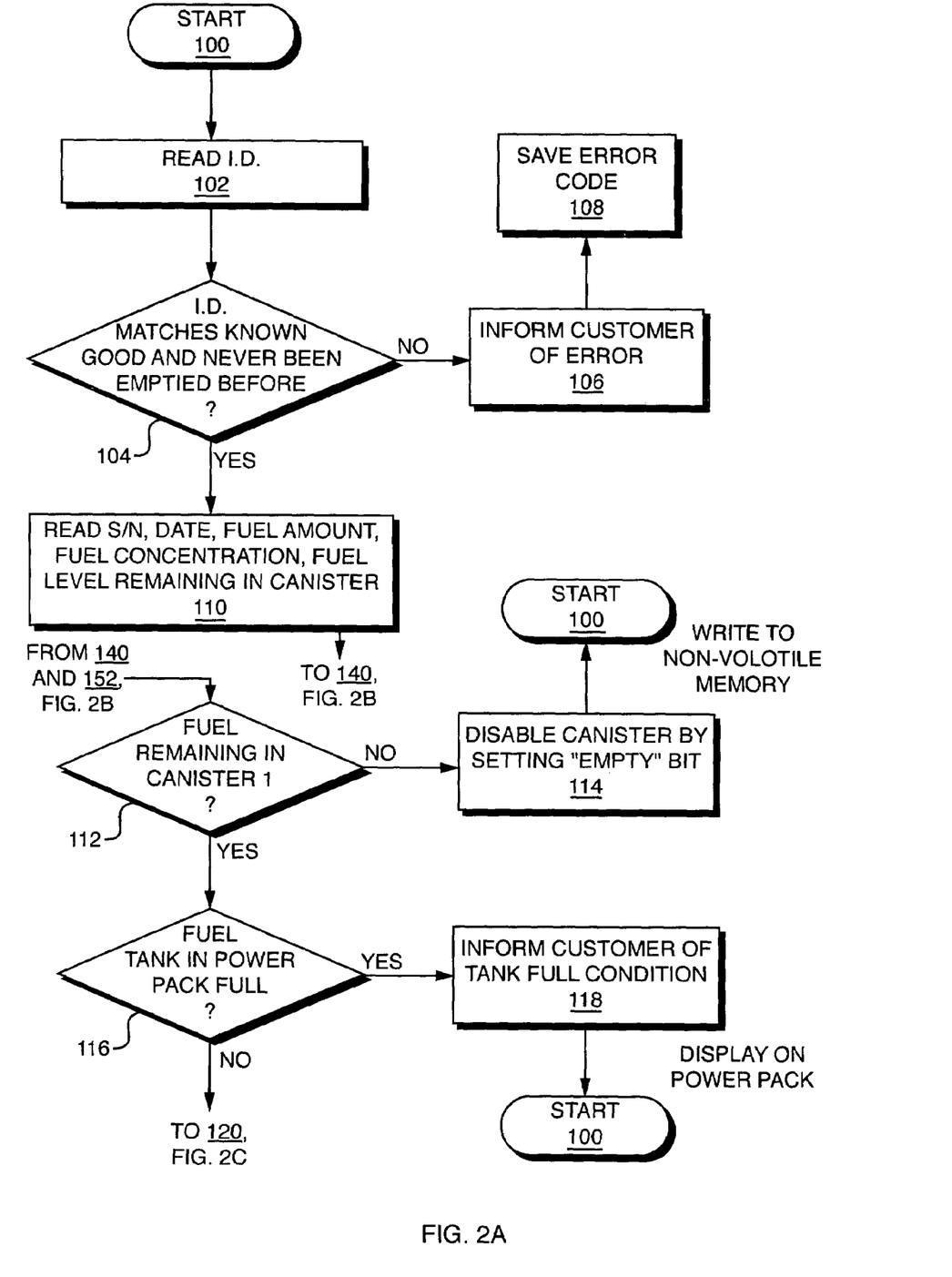
FIGS. 2A-2D are flow charts of a method for management of a fuel cell with a canister in accordance with embodiments of the present invention.

A method for controlling the operation of a fuel cell system 10(1) or 10(2) in accordance with embodiments of the present invention is discussed below. By way of example, specific reference is made to system 10(1) with reference to FIGS. 1A and 2A-2D. Although other sequences giving rise to the same fundamental functionality could be used. Referring more specifically to FIG. 2A, in step 100 the operation starts. In step 102, a fuel canister 14(1) is detachably coupled to the fuel processing system 17(1) and information about the identification of the fuel canister 14(1) stored in the container control system 20 is read by the delivery control system 32.

In step 104, the delivery control system 32, checks the information about the identification of the fuel canister 14(1) to determine if the fuel in the fuel canister 14(1) is an appropriate type for the fuel processing system 17(1). The delivery control system 32 has identification information stored in memory which can be retrieved and compared against the identification information from the fuel canister 14(1) to determine if there is a match, although other techniques for determining if the fuel in fuel canister 14(1) is an appropriate type for the fuel processing system 17(1) can be used. If in step 104 the delivery control system 32 determines that the fuel canister 14(1) is not the appropriate type for the fuel cell system 10, then the No branch is taken to step 106.

In step 106, the delivery control system 32, the replenishment control system 12, and the appliance receiving power from the fuel cell processing system 17(1) may each inform the operator of the fuel cell system 10(1) of the error using the display 31 or by any other means available to the fuel cell 17(1). Although a display 31 is used in this example to inform the operator of the error, other types of notification systems, such as a light or buzzer, could be used to tell the operator that the wrong type of fuel canister 14(1) had been installed. Accordingly, the present invention helps to ensure that the right fuel canister 14(1) with the right fuel is used in the fuel cell system 10(1).

In step 108, the replenishment control system 12, the delivery control system 32, and the appliance may each store an error code in memory 26 or their respective memory subsystems of the determination that the wrong type of fuel canister 14(1) was installed for future use, although other techniques for recording the error can be used. The system 10(1) returns to step 100 and starts again when the current fuel canister 14(1) is removed and a new fuel canister 14(1) is installed in the fuel processing system 17(1).

If in step 104 the delivery control system 32, based on the obtained identification information, determines that the fuel canister 14(1) is an appropriate type for the fuel processing system 17(1), then the Yes branch is taken to step 110. In step 110, the delivery control system 32 reads information, such as the serial number of the fuel canister 14(1), the date of manufacture or expiration date of the fuel canister 14(1), a measurement of the level or amount of fuel remaining in the fuel canister 14(1) and a measurement of the fuel concentration in the fuel canister 14(1), from the container control system 20, although other types of information can be obtained. The container control system 20 has some of this static information, such as the serial number of the fuel canister 14(1) and the date of manufacture or expiration date of the fuel canister 14(1), stored in memory in container control system 20. Other dynamic information, such as a measurement of the level or amount of fuel remaining in the fuel replenishment source container and the amount of space available in the spent fuel storage and a measurement of the fuel concentration each is obtained by sensor system 22 and is transmitted to the container control system 20. Since the manner in which a sensor system 22 monitors and measures for information, such as a measurement of the level or amount of fuel remaining in the fuel container and a measurement of the fuel concentration in the fuel canister 14(1), is well known to those of ordinary skill in the art it will not be described in detail here.

Figure 2B:
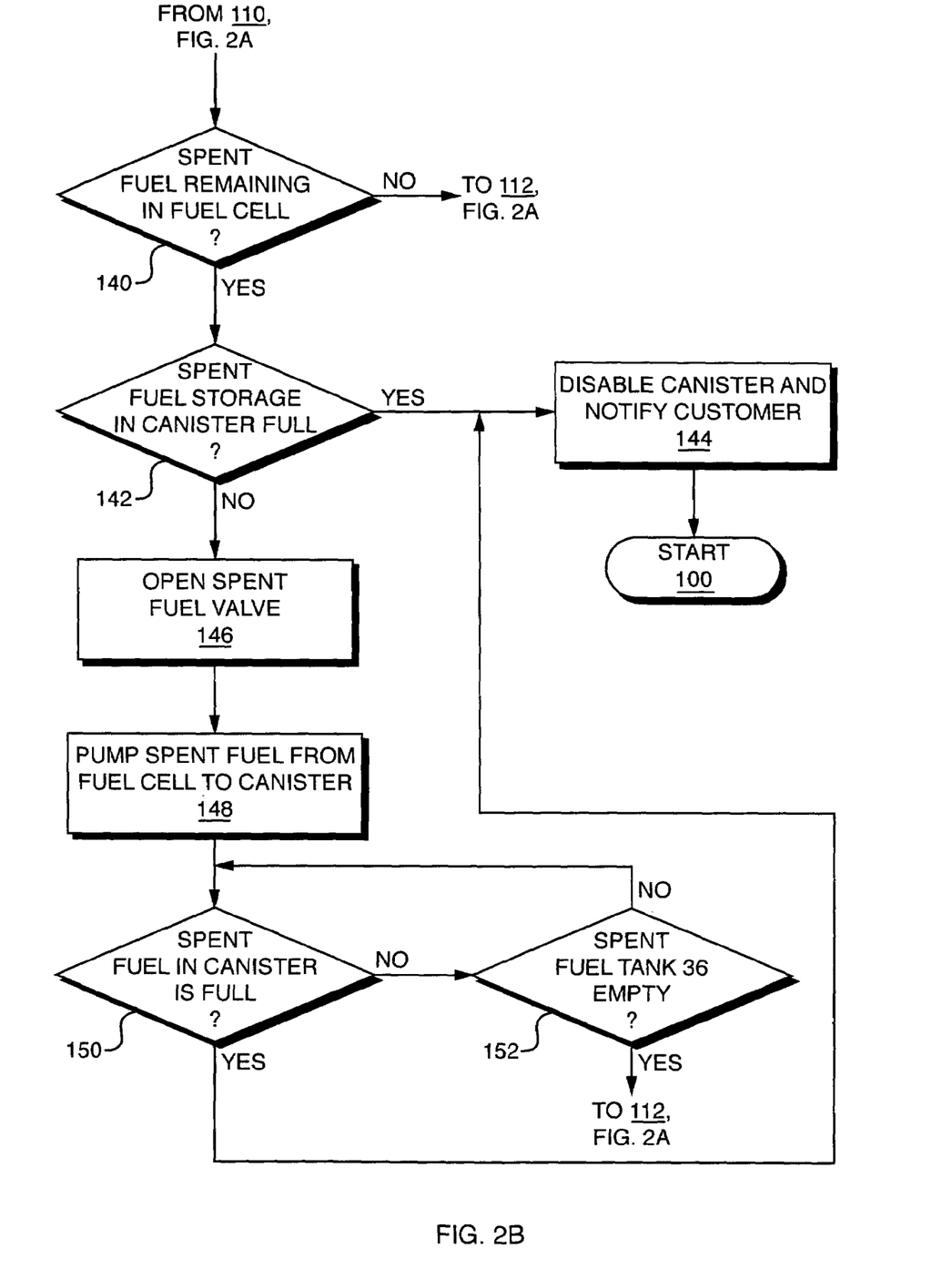

Referring to FIG. 2B, in step 140 the delivery control system 32 determines if there is any spent fuel remaining in the spent fuel tank 36. This information is relayed to the replenishment control system 12. If there is no spent fuel remaining, then the No branch is taken in step 140 and the delivery control system 32 moves to step 112. If there is spent fuel remaining, then the Yes branch is taken in step 140 and the delivery control system 32 moves to step 142.

In step 142, the delivery control system 32 checks the container control system 20 to sense if the spent fuel storage 19 is full. If the spent fuel storage 19 is not full, then the No branch is taken in step 142 and control moves to step 146. If the spent fuel storage 19 is full, then the Yes branch is taken to step 144. In step 144, the fuel canister 14(1) is disabled by writing information to the replenishment control system 12, and an appropriate output signal is conveyed to the user by display 31 or by other means available, then the sequence moves to the step 100.

In steps 146, 148 the delivery control system 32 acts in concert with the container control system 20 to convey spent fuel from the spent fuel tank 36 to the spent fuel storage 19 by opening the spent fuel valve and pumping the spent fuel from the spent fuel tank 36 to the spent fuel storage 19. If there is no fuel available in the fuel tank 34, then the delivery control system 32 will notify the replenishment control system 12 to utilize the backup battery to energize valves or pumps as necessary. Conveyance of spent fuel occurs by appropriate selection of valves or pumps, such that there is a substantial connection to move fuel in any form of matter, solid, liquid or gas, as is well known to those of ordinary skill in the art.

In step 150 the delivery control system 32 determines if there is space available in the spent fuel storage 19. If the spent fuel storage 19 is not full, then the No branch is taken in step 150 and control moves to step 152. If during this step the spent fuel storage 19 becomes full, then the Yes branch is taken in step 150 and control moves to step 144.

In step 152 the delivery control system 32 checks if the spent fuel tank 36 becomes empty. If the spent fuel tank 36 becomes empty, then the Yes branch is taken in step 152 and control moves to step 112. If the spent fuel tank 36 is not empty, then the No branch is taken in step 152 back to step 150 where the transfer of spent fuel continues until the spent fuel storage 19 is filled or the spent fuel tank 36 is empty, which ever occurs first.

Referring back to FIG. 2A, in step 112 delivery control system 32 determines if there is any fuel remaining in the fuel canister 14(1). In this particular embodiment, the sensor system 22 upon request senses the amount of fuel remaining in the fuel replenishment source container 15 in the fuel canister 14(1) and transmits this information about the amount of remaining fuel to the container control system 20, although the sensor system 22 may operate in other manners, such as providing periodic readings of particular characteristics in the fuel canister 14(1). The container control system 20 transmits this information to the replenishment control system 12 and the delivery control system 32. If substantially all of the fuel has been used in the fuel canister 14(1), then the No branch is taken to step 114.

In step 114, the delivery control system 32, transmits information to the container control system 20 and the replenishment control system 12 in fuel canister 14(1) to record information indicating that the fuel canister 14(1) is at least substantially empty, such as by setting a bit stored in memory in container control system 20 and in memory 26, to signify an empty setting. If the fuel canister 14(1) is reinserted in a fuel processing system 17(1), the recorded information that the fuel canister 14(1) is empty can be read out. In that case the delivery regulation system 16 will shut off the delivery of fuel, e.g. by closing a valve or valves and/or turn off a pump or pumps in the connecting pipes, from the fuel canister 14(1) to the fuel processing system 17(1). Meanwhile, if the fuel cell 18 is out of fuel and thus is not generating power, the replenishment control system 12 connects the backup battery 28 until more fuel can be supplied. The system 10(1) returns to step 100 and starts again when the current fuel canister 14(1) which is empty is removed and a replaced with a new fuel canister 14(1).

In step 116, the delivery control system 32 determines if the fuel tank 34 which supplies fuel to the fuel cell 18 is full of fuel. A sensor system 37 in or otherwise in communication with the fuel tank 34 senses the amount of fuel remaining in the fuel tank 34 and transmits this information about the amount of remaining fuel to the replenishment control system 12. If the fuel tank 34 is substantially full with fuel, then the Yes branch is taken to step 118.

In step 118, the operator of the fuel cell system 10(1) is notified on the display 31 or on any other display, as mentioned previously, that the fuel tank 34 is substantially full with fuel, although other manners for indicating the status of fuel can be used. Once step 118 is completed, then the fuel cell system 10(1) proceeds to step 100 as described earlier.

Figure 2C:
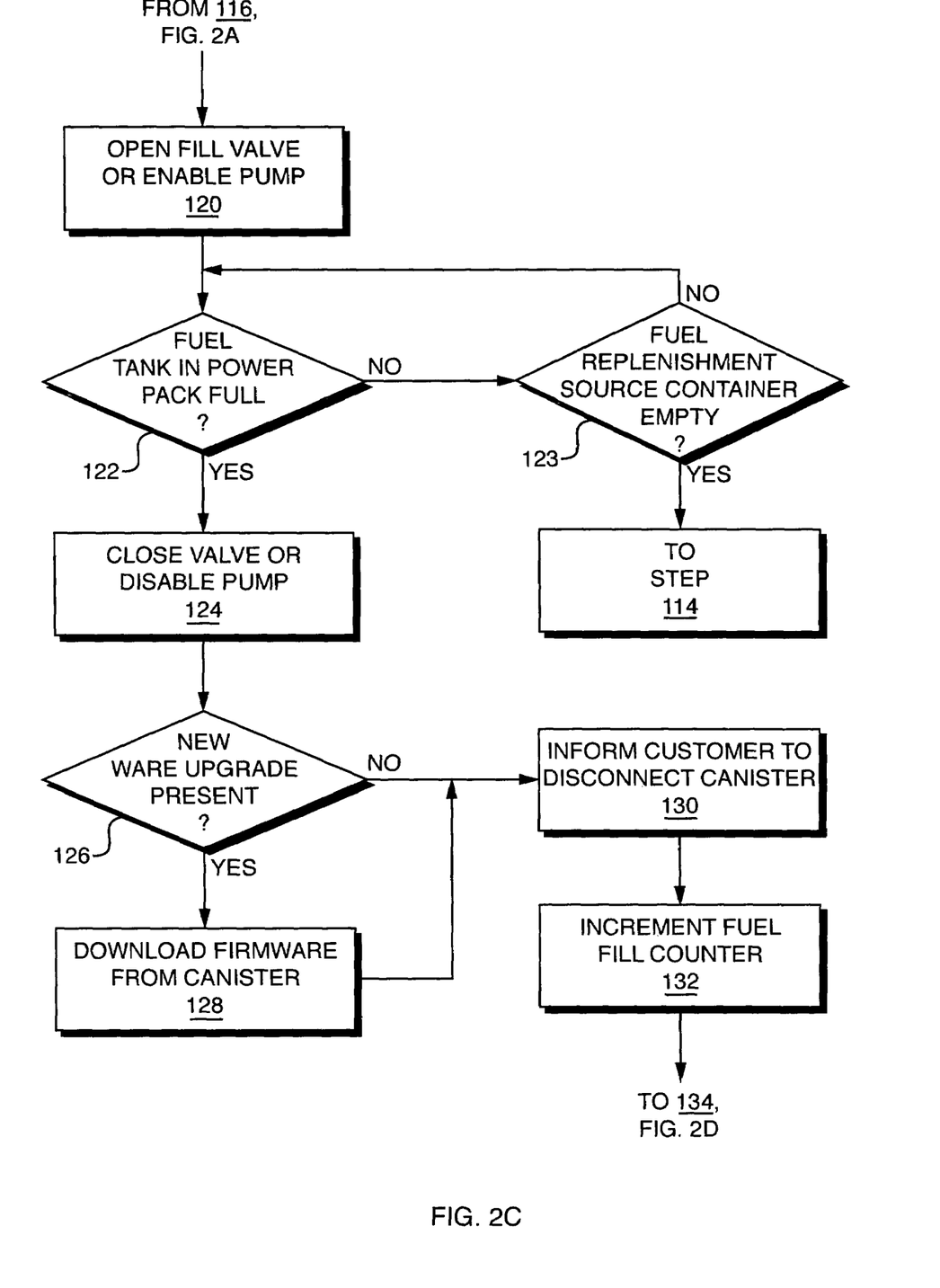

If in step 116 the fuel tank 34 is not substantially full with fuel, then the No branch is taken to step 120 in FIG. 2C. In step 120, the delivery control system 32 in the delivery regulation system 16 contacts the container control system 20 to open a valve or valves and/or turn on a pump or pumps to permit the flow of fuel from the fuel canister 14(1) to the fuel tank 34. The delivery control system 32 in the delivery regulation system 16 opens a valve or valves and/or turns on a pump or pumps to permit the flow of fuel from the fuel replenishment source container 15 to the spent fuel tank 34

In step 122, delivery control system 32 determines if the fuel tank 34 has been substantially refilled with fuel. Again, a sensor system 37 in or otherwise in communication with the fuel tank 34 senses the amount of fuel in and transmits this information about the amount of remaining fuel to the replenishment control system 12 through the delivery regulation system 16. If the fuel in the fuel tank 34 is not substantially filled with fuel, then the No branch is taken to the start of step 123. The delivery regulation system 16 keeps checking in step 122 until the fuel tank 34 has been substantially refilled with fuel. If the fuel tank 34 is substantially filled with fuel, then the Yes branch is taken to step 124.

In step 123, the replenishment control system determines if the fuel replenishment source container 15 is empty using sensor system 22. If the fuel replenishment source container 15 is determined to be empty, then the Yes branch is taken and control moves to step 114. If the fuel replenishment source container 15 is determined not to be empty, then the No branch is taken in step 123 and the transfer of fuel continues in steps 122 and 123 while the fuel replenishment source container 15 is not empty and while the fuel tank 34 is not full. Meanwhile, if the fuel tank 34 becomes full, then in step 122 the Yes branch is taken and control moves to step 124.

In step 124, delivery control system 32 in the delivery regulation system 16 contacts the container control system 20 to close the valve or valves and/or turn off the pump or pumps to stop the flow of fuel from the fuel canister 14(1) to the fuel tank 34.

In step 126 delivery control system 32 determines if the fuel canister 14(1) which has been detachably connected to the fuel processing system 17(1) has any new instructions stored in memory in replenishment control system 12. If the replenishment control system 12 in fuel canister 14(1) has new instructions to be downloaded, then the Yes branch is taken to step 128.

In step 128, the replenishment control system 12 in fuel canister 14(1) transmits or downloads the new instructions to the delivery regulation system 16 for storage in memory. These new instructions may include new or updated steps and/or data for managing the control of the fuel cell system 10(1).

If in step 126, the delivery control system 32 determines that the replenishment control system 12 in fuel canister 14(1) does not have new instructions to be downloaded, then the No branch is taken to step 130 or if the information has been downloaded in step 128, then the fuel cell system 10(1) proceeds to step 130.

In step 130, the replenishment control system 12 on the display 31 informs the operator of the fuel cell system 10(1) to disconnect the detachably connected fuel canister 14(1), although the replenishment control system 16 and the delivery regulation 16 may communicate to the operator in other manners including display on the appliance being powered by the fuel cell.

In step 132, the replenishment control system 12 increments a fuel fill counter to record information about the refilling operation including but not limited to the amount of fuel that was transferred to the fuel tank 34, the amount of spent fuel that was transferred from the spent fuel tank 36 and the number of times each operation was executed.

Figure 2D:
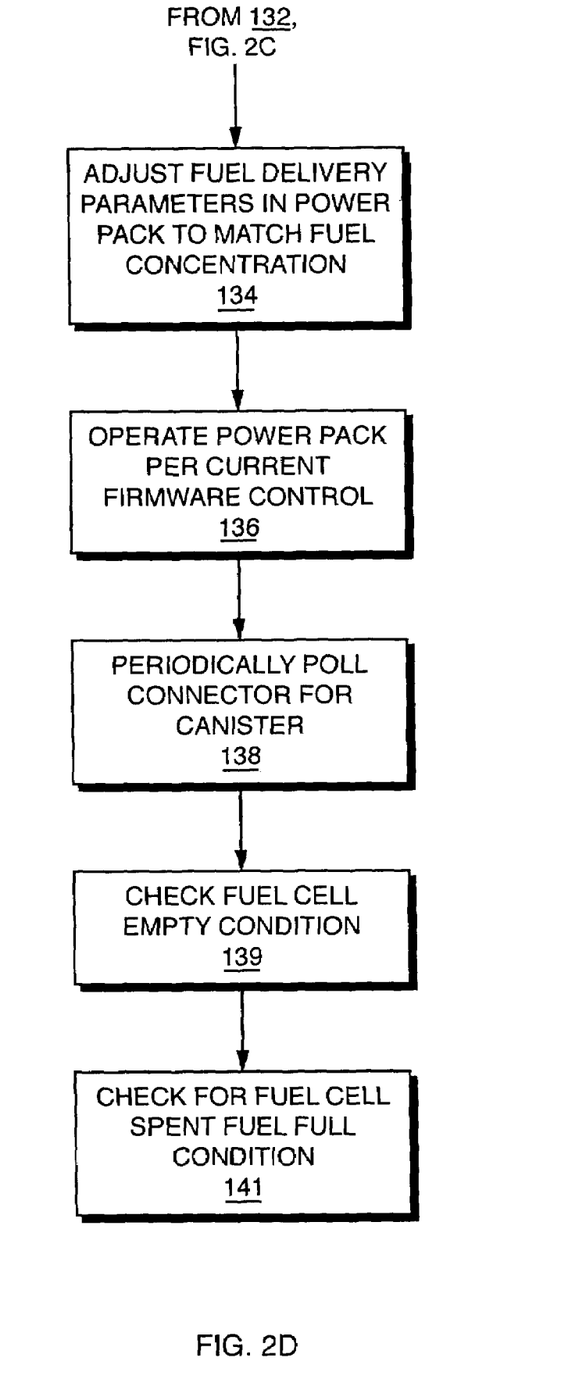

Referring to FIG. 2D, in step 134 the delivery regulation system 16 obtains a measurement or reading of the fuel concentration in the fuel tank 34. Based on the measured fuel concentration, the delivery regulation system 16 determines adjusted fuel delivery parameters from the fuel tank 34 to the fuel cell 18. The delivery regulation system 16 uses these adjusted parameters to control how the delivery control system 32 controls how much the valve or valves are opened and how fast the pump or pumps operate to allow the fuel to flow from the fuel tank 34 to the fuel cell 18, if at all. Accordingly, with the present invention the operation of the fuel cell system 10(1) can continually be optimized as the properties of the remaining fuel change.

In step 136, the delivery regulation system executes the instructions for managing the control of the fuel cell system 10(1) using any new instructions which may have been downloaded.

In step 138, the delivery regulation system 16 periodically polls to see if a fuel canister 14(1) has been detachably connected, although other manners for signaling the connection of a fuel canister 14(1) can be used.

In step 139, the delivery control system 32 checks using sensor system 37 to determine if the fuel tank 34 is in an empty condition. If the fuel tank 34 is empty or is below a set level, the operator of the fuel cell system 10(1) will be notified on the display 31 or on another display that a fuel container 14(1) needs to be connected to supply more fuel.

In step 141, the delivery control system 32 also checks using sensor system 38 to determine if the spent fuel tank 36 is in a full condition. If the fuel tank 34 is full or is above a set level, the operator of the fuel cell system 10(1) will be notified on the display 31 or on another display that a fuel container 14(1) needs to be connected to remove spent fuel. Although different steps have been described herein as being carried out by a particular control system 12, 20, and 32, it will be readily apparent to one of ordinary skill in the art that other arrangements for carrying out these steps could be used.

Figure 3A:
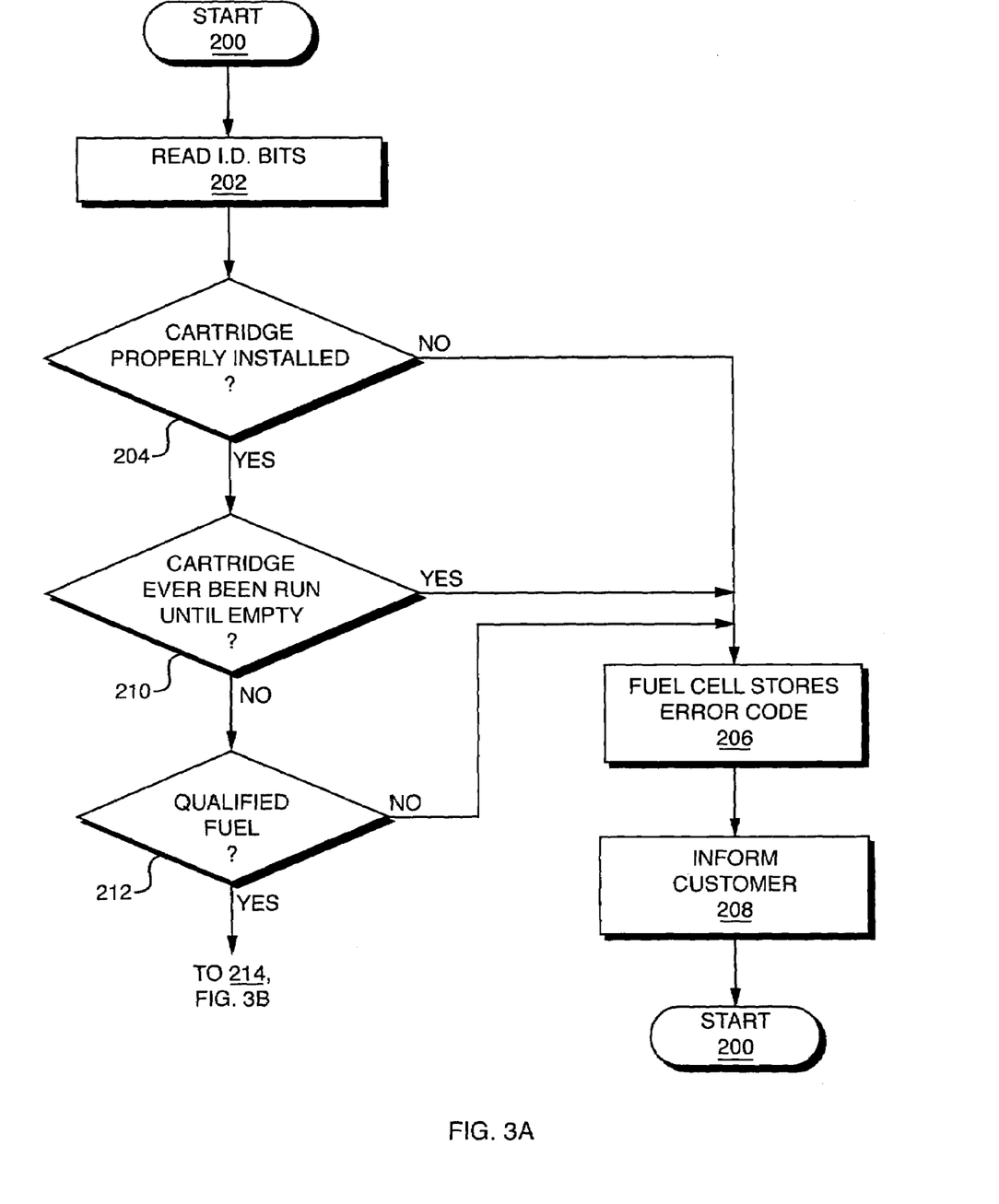
FIGS. 3A-3B are flow charts of a method for management of a fuel cell with a canister in accordance with embodiments of the present invention.

A method for controlling the operation of a fuel cell system 10(2) in accordance with embodiments of the present invention is discussed below with reference to FIGS. 1B and 3A-3B. Referring more specifically to FIG. 3A, in step 200 the operation starts. In step 202, a fuel cartridge 14(2) is detachably coupled to the fuel processing system 17(2) and information about the identification of the fuel cartridge 14(2) stored in the container control system 20 is read by the replenishment control system 12.

In step 204, the replenishment control system 12 determines if the fuel cartridge 14(2) is properly installed. One manner to determine if the fuel cartridge 14(2) is properly installed is to determine if a communication between the replenishment control system 12 and the container control system 20 can be established, although other manners for making this determination can be used. If in step 204 the replenishment control system 12 determines that the fuel cartridge 14(2) is not properly installed, then the No branch is taken to step 206.

In step 206, the replenishment control system 12 stores an error code in memory 26 of the error, such as a determination that the fuel cartridge 14(2) was not properly installed, determination that the wrong type of fuel cartridge 14(2) was installed, that the fuel cartridge 14(2) has run empty, or that the fuel in the fuel cartridge 14(2) does not qualify, although other techniques for recording the error can be used.

In step 208, the replenishment control system 12 informs the operator of the fuel cell system 10(2) of the error using the display 31. Although a display 31 is used in this example to inform the operator of the error, other types of notification systems, such as different illuminated displays or different sounds, could be used to signal the operator of the particular error. The system 10(2) returns to step 100 and starts again when a new fuel cartridge 14(2) is installed in the fuel processing system 17(1).

If in step 204 the replenishment control system 12, based on the obtained identification information, determines that the fuel cartridge 14(2) is properly installed for the fuel processing system 17(2), then the Yes branch is taken to step 210.

In step 210, the replenishment control system 12 determines if fuel cartridge 14(2) had ever been emptied. In this particular embodiment, the container control system 20 upon request sends stored data about the history of the cartridge 14(2) and the level of fuel remaining in the fuel replenishment source container 15 and transmits this information to the replenishment control system 12. If substantially all of the fuel has been used or the fuel cartridge 14(2) is empty, then the Yes branch is taken to step 206 as described earlier. If substantially all of the fuel has not been used in the fuel cartridge 14(2), then the Yes branch is taken to step 212.

In step 212, the replenishment control system 12, determine if the fuel in the fuel cartridge 14(2) is qualified or an appropriate type for the fuel processing system 17(2). The replenishment control system 12 has identification information stored in memory 26 which can be retrieved and compared against the identification information about the fuel from the fuel cartridge 14(2) to determine if there is a match, although other techniques for determining if the fuel in fuel cartridge 14(2) is qualified can be used. If in step 212 the replenishment control system 12 determines that the fuel in fuel cartridge 14(2) is not qualified, then the No branch is taken to step 206 as described earlier. If in step 212 the replenishment control system 12 determines that the fuel in fuel cartridge 14(2) is qualified, then the Yes branch is taken to step 214.

Figure 3B:
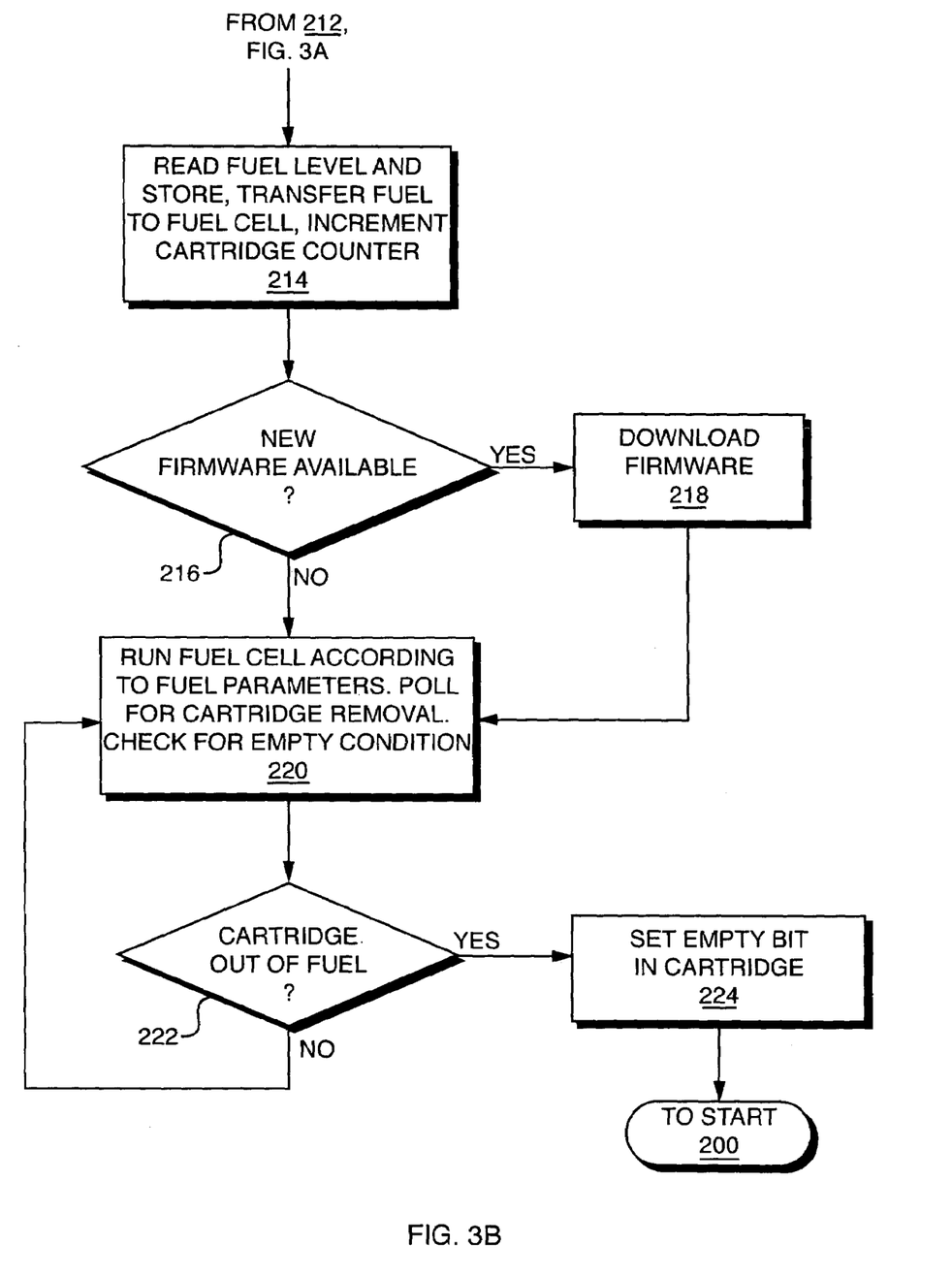

Referring to FIG. 3B, in step 214, the sensor system 22 senses or otherwise measures a level of fuel in the fuel replenishment source container 15 and transmits this information about the amount of remaining fuel to the replenishment control system 12. The replenishment control system 12 stores this information in memory 26 and triggers an increment in a counter in the cartridge 14(2). Based on this information about the amount of fuel, the replenishment control system may also initiate a transfer of fuel from the fuel replenishment source container 15 to the fuel tank 34. Back-up battery 28 may be used at any time to provide power for computing or for actuation of pumps and valves if the fuel cell power generation system 18 is substantially out of fuel.

In step 216, the replenishment control system 12 determines if the fuel cartridge 14(2) which has been detachably connected to the fuel processing system 17(2) has any new instructions stored in memory in container control system 20. If the container control system 20 in fuel cartridge 14(2) has new instructions to be downloaded, then the Yes branch is taken to step 218.

In step 218, the container control system 20 in fuel cartridge 14(2) transmits or downloads the new instructions to the replenishment control system 12 for storage in memory 26. These new instructions may include new or updated steps and/or data for managing the control of the fuel cell system 10(2).

If in step 216 the replenishment control system 12 determines that the container control system 20 in fuel canister 14(1) does not have new instructions to be downloaded, then the No branch is taken to step 220 or if the information has been downloaded in step 218, then the fuel cell system 10(2) proceeds to step 220.

In step 220, the replenishment control system 12 executes the instructions for managing the control of the fuel cell system 10(2) using any new instructions which may have been downloaded. The replenishment control system 12 also periodically polls to see if a fuel cartridge 10(2) has been removed, although other manners for signaling the removal of a fuel cartridge 14(2) could be used. Further, the replenishment control system 12 monitors for an empty fuel condition in fuel replenishment source container 15 and spent fuel storage 19 in fuel cartridge 14(2) using sensor system 22.

In step 222, the replenishment control system 12 determines if the fuel replenishment source container 15 in fuel cartridge 14(2) which supplies fuel to the fuel cell 18 is out of fuel. The sensor system 20 in or otherwise in communication with the fuel replenishment source container 15 senses the amount of fuel remaining in the fuel container 14(2) and transmits this information about the amount of remaining fuel to the replenishment control system 12. If the fuel replenishment source container 15 is not out of fuel, then the No branch is taken to step 220. If the fuel replenishment source container 15 is out of fuel, then the Yes branch is taken to step 224.

In step 224, the replenishment control system 12 transmits information to the container control system 20 in fuel cartridge 14(2) to record information indicating that the fuel cartridge 14(2) is at least substantially empty, such as by setting a bit stored in memory in container control system 20 to signify an empty setting. If the fuel cartridge 14(2) is reinserted in a fuel processing system 17(2), the recorded information that the fuel cartridge 14(2) is empty can be read out. The replenishment control system 12 also notifies the delivery regulation system 16 to shut off the delivery of fuel, e.g. by closing a valve or valves and/or turn off a pump or pumps in the connecting pipes, from the fuel cartridge 14(2) to the fuel cell 18. Meanwhile, if the fuel cell 18 is out of fuel and this is not generating power, the replenishment control system 12 connects the backup battery 28 until more fuel can be supplied. The system 10(2) returns to step 100 and starts again when the current fuel cartridge 14(2) which is empty is removed and a replaced with a new fuel cartridge 14(2).

Accordingly, as illustrated above, present invention provides a system and method for effectively and efficiently managing refueling and fuel delivery in a fuel cell system 10. With the present invention, information, such as the volume of remaining fuel, fuel concentration, the installation date, and the identification of the fuel container 14, can be obtained from the fuel container 14. Additionally, information, such as the history use of the fuel container 14, can be obtained from the fuel container 14. Any or all of this information about the fuel contained 14 can be used to manage the transfer of fuel or spent fuel to and from the fuel cell. Further, with the present invention the fuel supply system can perform in field operating software upgrades.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A fuel system, comprising:
a fuel processing system including a fuel cell for converting fuel into electrical energy;
a fuel canister for storing fuel for the fuel cell, the fuel canister being detachably connected to the fuel cell processing system, wherein the fuel canister includes a container control system for storing information about an identification of the fuel canister, and a communication interface which is detachably coupled to the container control system to provide a communication link between the fuel canister and the fuel cell processing system;
a fuel delivery control system having a processor, a memory, and an I/O interface system, wherein the delivery control system is configured to read and to check the infor-mation about the identification of the fuel canister in order to determine if the fuel in the fuel canister is an appropriate type of fuel for the fuel cell;
a sensor system for sensing an amount of fuel remaining in the fuel canister and for transmitting this information about the amount of remaining fuel to the container con-trol system;
a fuel replenishment source container connected to a fuel supply system which is in communication with the fuel cell, the container control system being configured to control the fuel replenishment source container such as to replenish fuel contained in the fuel replenishment container if the amount sensed is below a set replenishment level; and
a replenishment control system coupled to the fuel delivery control system, the replenishment control system having a processor, a memory, a backup battery, a user in-put device, and a display, wherein the memory in the replenishment control system is configured to store information about the fuel replenishment source container.

2. The fuel cell system, as set forth in claim 1, wherein the delivery control system comprises a memory for storing identification information, the delivery control system being configured to retrieve and compare the identification information stored in the memory against the identification information from the fuel canister to determine if there is a match.

3. The fuel cell system, as set forth in claim 1, wherein the delivery control system is further configured to prevent a supply of fuel from the fuel canister to the fuel cell system if the delivery control system determines that the fuel is not appropriate.

4. The fuel cell system, as set forth in claim 1, wherein the fuel delivery control system determines if new instructions to manage fuel supplied from the container control system are available when the fuel canister is connected.

5. A method for controlling operation of a fuel cell system, comprising:
supplying fuel for conversion into electrical energy;
converting the supplied fuel into electrical energy;
obtaining information about the fuel by reading and checking information of a fuel canister detachably connected to the fuel cell system in order to determine if the fuel is an appropriate type of fuel based on the information stored within the fuel container;
sensing an amount of fuel remaining in the fuel canister before supplying the fuel;
connecting a fuel replenishment source container to a fuel supply system which is in communication with the fuel cell, the container control system being configured to control the fuel replenishment source container such as to replenish fuel contained in the fuel replenishment container if the amount sensed is below a set replenishment level; and
storing information about the fuel replenishment source container, by a replenishment control system.

6. The method of claim 5, further comprising:
regulating the supply of fuel based on information about the supplied fuel to control the conversion into electrical energy.

7. The method of claim 5, further comprising:
preventing the supplying of fuel if the checking determines that the fuel is not the appropriate type of fuel.

8. The fuel cell system, as set forth in claim 4, wherein the fuel delivery control system obtains the new instructions from the container control system when the fuel delivery control system determines the new instructions are available.

* * * * *